United States Patent [19]
Sumpter, Sr.

[11] Patent Number: 5,711,402
[45] Date of Patent: Jan. 27, 1998

[54] OIL DRIP COLLECTOR

[76] Inventor: Alray Sumpter, Sr., 17489 Star Canyon Ct., Riverside, Calif. 92503

[21] Appl. No.: 753,219

[22] Filed: Nov. 21, 1996

Related U.S. Application Data

[60] Provisional application No. 60/007,647, Nov. 28, 1995.

[51] Int. Cl.⁶ .................................................. F16W 31/00
[52] U.S. Cl. ........................... 184/106; 296/38; 141/98; 180/69.1
[58] Field of Search ................ 184/1.5, 106; 141/98, 141/86–88; 180/69.1; 296/38

[56] References Cited

U.S. PATENT DOCUMENTS

| | | |
|---|---|---|
| 2,732,024 | 1/1956 | Schonwald . |
| 2,783,848 | 3/1957 | Beskid . |
| 3,195,683 | 7/1965 | Peterson et al. ............ 184/106 |
| 3,282,381 | 11/1966 | Fitzpatrick ................ 184/106 |
| 3,284,273 | 11/1966 | Prentice ................... 180/69.1 |
| 3,316,995 | 5/1967 | Fay . |
| 3,329,231 | 7/1967 | Takenouchi . |
| 3,333,652 | 8/1967 | Tribuzi . |
| 3,785,451 | 1/1974 | McCord . |
| 3,918,542 | 11/1975 | Murillo . |
| 4,664,959 | 5/1987 | Dagenais et al. . |
| 4,875,537 | 10/1989 | Garnatz et al. . |
| 4,909,355 | 3/1990 | Ramos . |
| 4,936,418 | 6/1990 | Clausen . |
| 5,020,638 | 6/1991 | Smith ...................... 184/106 |
| 5,358,863 | 10/1994 | Quimby, Jr. et al. ........ 435/178 |
| 5,404,848 | 4/1995 | Nelson . |
| 5,417,310 | 5/1995 | Halseth . |

*Primary Examiner*—Thomas E. Denion
*Attorney, Agent, or Firm*—Knobbe, Martens, Olson & Bear, LLP

[57] ABSTRACT

An apparatus for capturing oil dripping from the bottom of a vehicle. The apparatus includes a pan that is preferably made of a rigid material such as aluminum or hard plastic. Positioned within the pan is a pad that includes absorbent material such as bentonite clay or diatomaceous earth. The pad is segmented into various pockets so that the material remains dispersed over the surface of the pad. The outer skin of the pad is made of a mesh material that allows oil dripping onto the pad to soak through the mesh material into the absorbent material in the pad. The pad is also configured to be positioned within the pan so as to be easily replaceable.

7 Claims, 2 Drawing Sheets

OIL DRIP COLLECTOR

This application claims the benefit of U.S. Provisional Application No. 60/007,647 filed on Nov. 28, 1995.

BACKGROUND OF THE INVENTION

1. Field of the Invention

The present invention relates to accessories for automobiles and, in particular, concerns an accessory that is attached to the underside of an automobile to capture oil and other drippings from the engine, the transmission or other ancillary parts of the automobile power train.

2. Description of the Related Art

One difficulty with automobiles is that the engines have a tendency, after long usage, to leak oil. The leaked oil can result in driveways and garages being stained. Further, the leakage of oil from the underside of cars results in a significant amount of oil accumulating on the roadways. During rains, this can present a driving hazard to motorists as the oil makes the roadway slick. Additionally, during rains the oil on the roadways eventually ends up in streams and other waterways thereby creating a significant environmental problem.

To address this particular problem, several oil drip collection devices have been developed. For example, U.S. Pat. No. 4,936,418 discloses an oil drip collector that is essentially comprised of an oval-figured flexible sheet-like member that has springs to attach it to the underside of a vehicle. This pad is positioned underneath the vehicle and preferably has an absorbent sponge that is adhered to the flexible piece of material. The absorbent sponge collects the oil dripping from the engine and thereby prevents it from falling to the roadway.

One problem with the device disclosed in U.S. Pat. No. 4,936,418 is that the absorbent sponge is small in cross-section and is not easily replaced. Specifically, as the sponge is saturated with oil, the entire device must be replaced. Further, this device is designed to be positioned underneath the automobile in the proximity of fast moving flying debris. Consequently, over long term usage, the flexible sheet can become torn or ripped which reduces the effectiveness of the device in preventing oil from dripping to the roadway during operation of the vehicle.

Several other oil catching devices have also been developed, however, they generally suffer from problems similar to the problems suffered by the device disclosed in U.S. Pat. No. 4,936,418. Specifically, many oft he oil drip collection devices previously developed consist of a single piece of absorbent material that is configured to be positioned underneath the engine of an automobile. Once this absorbent material is saturated with oil, the entire device has to be replaced. With some prior devices, the absorbent material is exposed to the roadway such that when the absorbent material becomes saturated, oil will drip from the absorbent material onto the roadway. Further, these types of oil collection devices use sponges and fibrous materials to absorb oil which often are very expensive and not specifically adapted to collecting and retaining oil.

Even further, many of these devices disclosed in the prior art are comprised of a single piece of fabric material. It will be appreciated that the device is to be located underneath the car, adjacent the roadway, in a position where the fabric is likely to be struck by rocks and debris. These rocks and debris can tear or otherwise damage the device thereby reducing its effectiveness in collecting dripped oil.

Even though there are some prior art devices that position a plate underneath an absorbent material (See, e.g., U.S. Pat. No. 5,404,848 and U.S. Pat. No. 3,329,231) these prior art devices are difficult to use and utilize expensive absorbent materials. In particular, U.S. Pat. No. 2,783,848 discloses a device that uses a single sheet of absorbent material, such as porous paperboard, which is not very effective in absorbing large quantities of dripping oil. Further, while U.S. Pat. No. 3,329,231 discloses using a package of material such as Sand and the like, the package that appears to have been contemplated in this patent is a single package of material. The absorbent material contained within the package can therefore be non-uniformly dispersed within the package as the vehicle moves to the point where oil is not absorbed by the absorbent materials in particular location.

Hence, from the foregoing, it can be appreciated that there is a need for an oil drip collection device that has absorbent material spread out over a large area and is easily replaceable. To this end, there is a need for an oil collection device that has an absorbent component that is inexpensive and readily replaceable. Further, the needed device should also be configured so that the absorbent component is adequately protected from damage by rocks and other roadway debris and the absorbent material remains uniformly dispersed under the engine so that oil dripping from different locations can be absorbed.

SUMMARY OF THE INVENTION

To address these needs, the oil drip collector of the present invention is comprised of a pan that can be attached to the underside of a car in a location subordinate the engine or other device of a car that is likely to drip oil, and an absorbent pad that is configured to be positioned within the pan. Preferably, the absorbent pad is comprised of a pouch that is sewn into segmented sections wherein the segmented sections are filled with a granular absorbent material. The granular absorbent material is a bentonite clay or diatomaceous earth based material such as the material sold in most automotive retail stores. The outer skin of the absorbent pad is preferably comprised of a mesh material such as the material that is generally used for screens or filters. This mesh material allows the oil that falls on the outer surface of the pouch to seep through to the absorbent granular material contained within the pouch. Further, since the pad is sewn into segmented sections and each of the segmented sections is filled with the granular absorbent material, the granular absorbent material remains dispersed in the pouch thereby enhancing the ability of the device to capture oil dripping from disparate locations off of the car.

The pad is preferably hooked into the pan in a way that allows for easy replacement of the pad when the pad becomes saturated with oil. Hence, the absorbent pad can be sold as a replacement component that simply has to be positioned within the pan.

The pan is preferably made of a metal material, such as aluminum, or a plastic material, and is configured so that when the pad is positioned within the pan, the pan provides protection to the pad from flying roadway debris. Further, the pan has springs which extend outward from the outer perimeter of the pan and attach to locations underneath the car to thereby position the pan under the area where the dripping oil is likely to originate. It will be appreciated that, once the pan is appropriately positioned, the pan will not even have to be completely removed even when the pad becomes saturated; the pan substantially remains in place and the pad can simply be replaced in the pan. This saves time for a person replacing a saturated pad as the person does not have to reposition all of the springs and hooks necessary to retain the pan in the desired position. These and other objects and advantages of the present invention will become more fully apparent from the following description taken in conjunction with the accompanying drawings.

DETAILED DESCRIPTION OF THE PREFERRED EMBODIMENT

Figure 1:
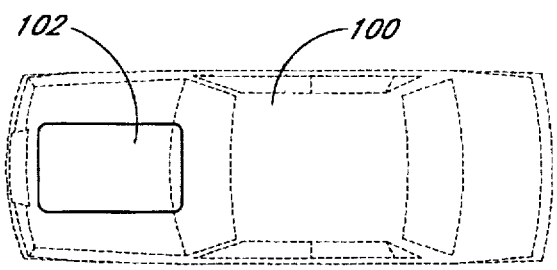
FIG. 1 is a top view of an automobile illustrating Where the oil drip collection apparatus of the preferred embodiment is to be installed.
Figure 2:
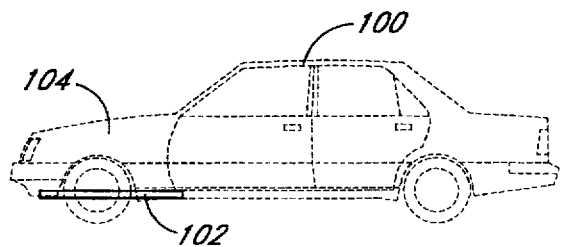
FIG. 2 is a side view of the automobile shown in FIG. 1 further illustrating the positioning of the oil drip collection apparatus on the automobile.

Reference will now be made to the drawings wherein like numerals refer to like parts throughout. FIG. 1 is a top view of an automobile 100 with a preferred embodiment of the oil drip collection apparatus 102 shown schematically as being installed underneath the engine compartment of the automobile 100. FIG. 2 is a side view of the automobile 100 further illustrating that the oil drip collection apparatus 102 is to be installed under the engine compartment 104 of the automobile 100. It will be appreciated that the exact dimensions of the oil drip collection apparatus 102 of the preferred embodiment will vary depending upon the configuration of the automobile 100. However, it is preferred that the oil drip collection apparatus 102 be dimensioned so as to be positioned substantially underneath the engine of the automobile 100.

As will be understood, the oil collection apparatus 102 should be positioned in the optimum position so that oil dripping from the engine or related parts of the automobile 100 should drip onto an upper surface of the oil collection apparatus 102. It will also be appreciated that the oil collection apparatus 102 should be positioned substantially adjacent the surfaces that the oil drips from as the dripping oil may otherwise be blown horizontally away from the oil collection apparatus 102 when the automobile 100 is moving.

Further, it may be desirable to extend the oil collection apparatus 102 so that it is also positioned underneath the transmission of the automobile as the transmissions in automobiles also have a tendency to leak transmission fluid or oil after long usage.

Figure 3:
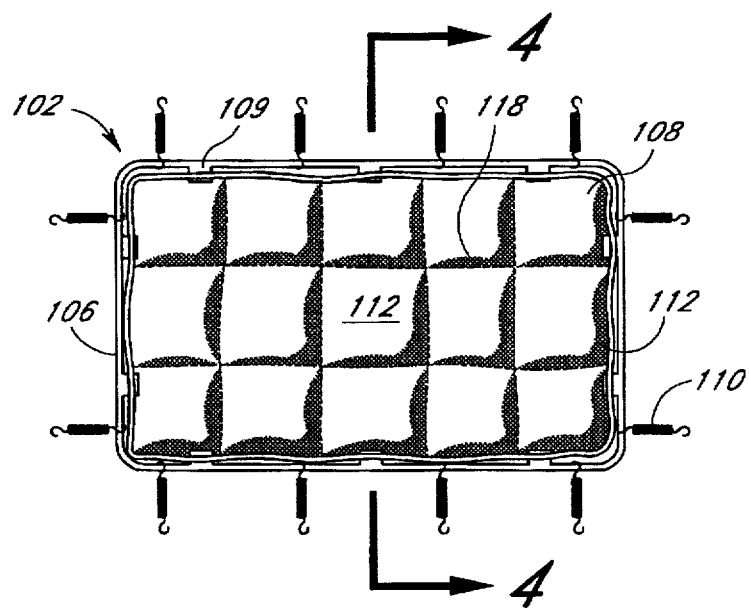
FIG. 3 is a top view of the oil collection apparatus of the preferred embodiment.
Figure 5:
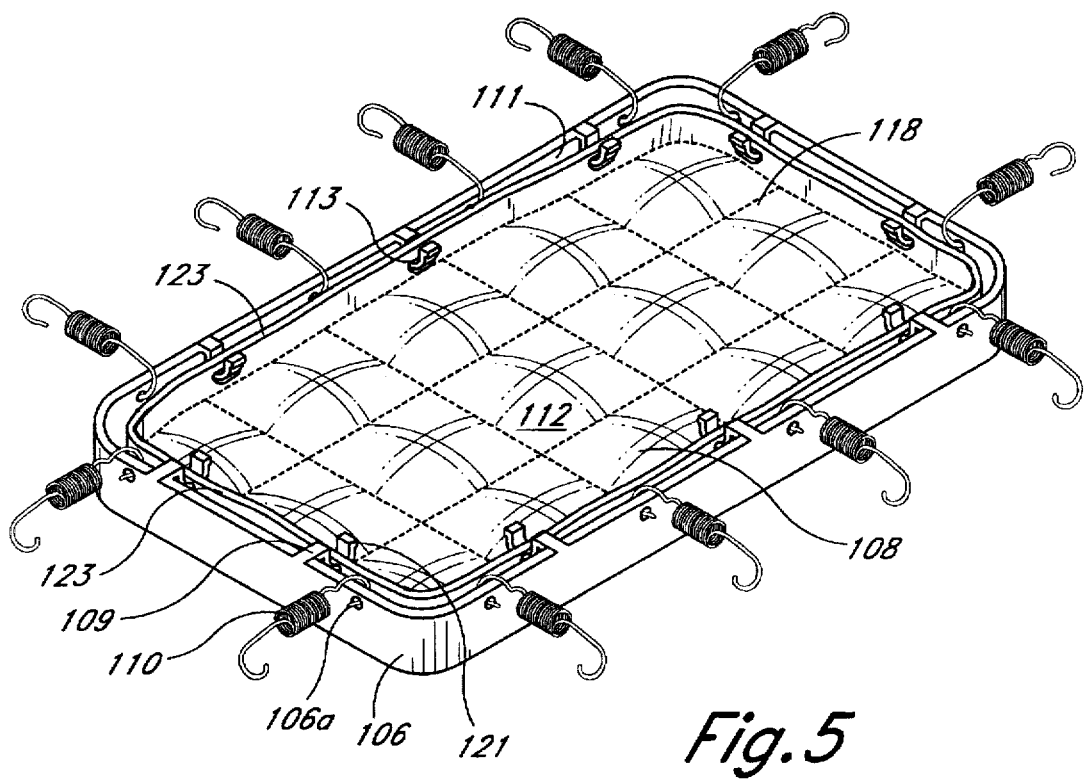
FIG. 5 is a perspective view of the apparatus shown in FIG. 3.

As shown in FIGS. 3 and 5, the oil collection apparatus is comprised of a pan 106 and a pad 108 positioned within the pan 106. The pan 106 has holes 106a along the outer perimeter that are configured to receive a plurality of springs 110. The springs 110 can then be hooked to components on the underside of the engine of the automobile 100 to securely retain the pan 106 in the position shown in FIGS. 1 and 2. Preferably, the springs 110 are hooked to components on the underside of the engine so that the pan 106 is substantially horizontally oriented underneath the engine compartment 104 of the automobile 100. In the embodiment shown in FIG. 3, a total of ten springs 110 are provided, however, it will be appreciated that more or less springs 110 may actually be used to securely position the device 102 underneath the automobile in the desired orientation. Once the springs 110 are hooked to the various components in the engine compartment 104, the pan 106 should be securely positioned underneath the engine compartment 104 substantially adjacent the under surface of the engine.

As is also shown in FIG. 3, the pan 106 has a plurality of inwardly extending protrusions 109 that extend inward into an inner space 111 defined by the pan 106. These protrusions 109 are configured to mate with openings 113 (See FIGS. 4 and 5) on the pad 108 to securely retain the pad within the pan 106 so that the pad 108 is equally distributed within the pan 106 in the manner shown in FIG. 3. The protrusions 109 preferably have a recess 121 that is configured to receive a seamed surface 123 of the pad 108 to securely retain the pad 108 in the pan 106.

The protrusions 109 and the openings 113 are preferably configured so that the pad 108 can be removed and replaced from the pan 106. In the embodiment shown in FIG. 3, the protrusion extends through an opening, however, it will be appreciated that a separate mating protrusion may be attached to the pad 108 to achieve the same interconnection between the pad 108 and the pan 106.

Figure 4:
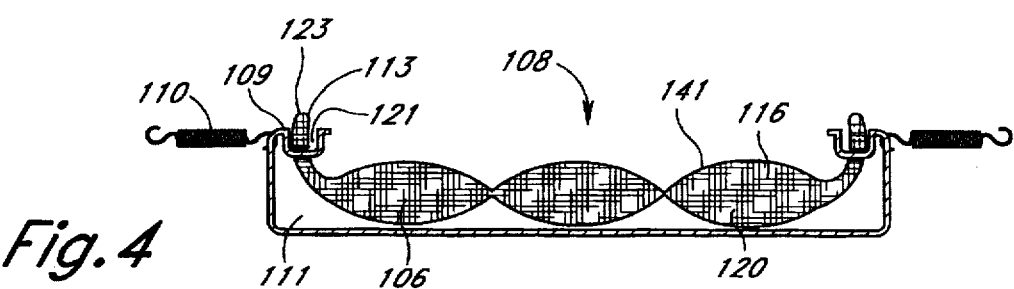
FIG. 4 is a cross-sectional view of the oil drip collection apparatus of FIG. 3.

As illustrated in FIGS. 3, 4 and 5, the pad 108 is divided into a plurality of pockets or sections 112. Further, the pad 108 has an outer cover 116 that is formed into a pouch and is preferably comprised of a mesh material 141 that will allow drops of oil that land on the outer surface of the pad 108 to seep inward into the pockets or sections 112. To create the pockets 112, the outer mesh material 116 is sewn together at intervals thereby creating the seams 118 shown in FIG. 3. Inside of each of the pockets 112 is an absorbent material 120, that is designed to absorb oil. The absorbent material is preferably a mix of granular material having average cross-sectional dimensions of approximately 1/16 to 1/4 inch. Each of the pockets or sections 112 are preferably filled with this material.

Since there is a plurality of pockets, the material remains substantially distributed over the surface of the pan 106. It will be appreciated that, absent the sections 112, the acceleration and deceleration of the automobile 100 would have a tendency to induce the granular absorbent material to collect at one end of the pad 108 thereby reducing the effectiveness of the oil drip collector 102. While in the preferred embodiment the absorbent material is a granular material, it will be appreciated that other well-known types of absorbent material can be used without departing from the scope of the present invention. The granular absorbent material is simply preferred in this embodiment as it is a readily available, proven absorbent material for oil. In particular, the material is comprised of an amorphous diatomaceous earth and crystalline silica mix such as the product sold as an oil absorbent by Molton Co. of Memphis, Tenn.

Hence, when the oil drips off of the engine and related parts it lands on the mesh material forming the outer cover 116 and then seeps through the mesh material to be absorbed by the absorbent material 120 positioned therein. Since the mesh material 116 is formed into a plurality of discrete pockets 112, this results in the absorbent material being dispersed throughout the entire surface of the pan 106. Once the absorbent material 120 in the pad 108 becomes saturated, the pad 108 can then be replaced, preferably by simply removing the pad 108 from the pan 106. It will be appreciated that the pan 106 may not have to be completely dismounted to remove the pad 108.

It will also be appreciated that the pan 106 serves two additional purposes. First, the pan 106 protects the pad 108 from damage resulting from rocks and other projectiles hitting the pad and ripping holes in the mesh material. Further, the pan 106 will capture any oil that would leak through the absorbent material 120 in the pad 108 when the absorbent material has become saturated with oil. Hence, the pan 106 provides additional protection from oil dripping onto the roadways. Further, it will be appreciated that drain holes can be added to the pan to facilitate the draining of accumulated water from the pan.

From the foregoing it can be appreciated that the oil drip collection apparatus 102 of the preferred embodiment provides an effective apparatus for collecting excess oil that is dripping off the engine. Further, since the pad 108 is replaceable within the pan 106, the apparatus 102 can be used repeatedly and the pad can be interchanged with new pads when needed in a time effective manner.

Although the foregoing description of the preferred embodiment of the preferred invention has shown, described, and pointed out the identical novel features of the invention, it will be understood that various omissions, substitutions, and changes in the form of the detail of the apparatus as illustrated, as well as the uses thereof, may be made by those skilled in the art without departing from the scope and spirit of the present invention. Hence, the scope of the present invention should not be defined by the preceding description, but should be defined by the following claims.

What is claimed is:

1. An apparatus for capturing oil dripping from a vehicle comprising:

a pan configured to be attached to said vehicle in a location wherein oil dripping from said vehicle will fall within a space defined by said pan; and a pad having a mesh material that is formed so as to have a plurality of separated segmented pockets, wherein a granular absorbent material is positioned within each of said segmented pockets, and wherein said pad is positioned within said space defined by said pan so that said oil dripping from said engine lands on said mesh material and seeps through said mesh material and is then absorbed by said granular absorbent material, wherein said pan includes a plurality of inwardly extending protrusions and said pad includes a plurality of openings formed in an outer surface of said pad so that said protrusions can be inserted into said plurality of openings in said pad so as to retain said pad in a position whereby said pad covers substantially the entire area of said space defined by said pan.

2. The apparatus of claim 1, wherein said granular absorbent material is comprised of a bentonite clay or diatomaceous earth material that has an average cross sectional width of between ¼ and ½ of an inch.

3. The apparatus of claim 2, wherein said mesh material is comprised of a mesh material that has square openings having a width of less than approximately ¼ of an inch.

4. The apparatus of claim 1, wherein said protrusions define an indentation that is configured to receive a lip of said openings in said pad.

5. The apparatus of claim 1, wherein said pan is made of a rigid material so that said pan protects said pad from flying debris occurring during operation of said vehicle.

6. The apparatus of claim 1, further comprising a plurality of springs that are attached to an outer perimeter of said pan and are configured so that said pan can be attached to the underside of said vehicle through said springs.

7. The apparatus of claim 6, wherein said pan and said pad are configured so that said pad can be removed and replaced in said pan while at least a portion of said plurality of springs remain attached to the underside of said vehicle.

* * * * *